United States Patent
Pruss et al.

(10) Patent No.: US 9,064,126 B2
(45) Date of Patent: Jun. 23, 2015

(54) DELEGATING AUTHORITY OF LICENSES TO USE COMPUTER PRODUCTS IN A DISCONNECTED NETWORK

(71) Applicant: CISCO TECHNOLOGY, Inc., San Jose, CA (US)

(72) Inventors: Richard Pruss, San Jose, CA (US); Morry Katz, San Jose, CA (US); Somyajit Jena, San Jose, CA (US); Alex Wight, San Jose, CA (US); Ben Strickland, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 44 days.

(21) Appl. No.: 13/924,603

(22) Filed: Jun. 23, 2013

(65) Prior Publication Data

US 2014/0380499 A1 Dec. 25, 2014

(51) Int. Cl.
*G06F 17/30* (2006.01)
*G06F 21/62* (2013.01)

(52) U.S. Cl.
CPC ..................................... *G06F 21/62* (2013.01)

(58) Field of Classification Search
CPC ....... G06F 21/10; G06F 21/62; G06F 21/105; G06F 21/12; G06F 21/123; H04L 63/0823
USPC .............. 726/26–30; 713/155–158, 173, 176; 705/51, 57–59
See application file for complete search history.

(56) References Cited

U.S. PATENT DOCUMENTS

| | | | | |
|---|---|---|---|---|
| 5,287,408 A | * | 2/1994 | Samson | 705/59 |
| 5,553,143 A | * | 9/1996 | Ross et al. | 705/59 |
| 5,758,068 A | * | 5/1998 | Brandt et al. | 726/27 |
| 7,155,414 B2 | * | 12/2006 | Barritz et al. | 705/59 |
| 2001/0039614 A1 | * | 11/2001 | Hellberg et al. | 713/156 |

* cited by examiner

*Primary Examiner* — Hosuk Song
(74) *Attorney, Agent, or Firm* — Patterson + Sheridan, LLP

(57) ABSTRACT

Techniques are provided for delegating authority over licenses to use computer products in a disconnected network. In one example, a collector device receives a delegation of authority from a license manager device to manage entitlements for a plurality of computer products installed in a network infrastructure. The collector device receives an identifier from each computer product. The collector device receives a configuration state of each computer product, wherein each configuration state includes a set of features that are enabled on the first computer product. The collector device sends to the license manager device a report that includes each identifier and each configuration state.

20 Claims, 8 Drawing Sheets

DELEGATING AUTHORITY OF LICENSES TO USE COMPUTER PRODUCTS IN A DISCONNECTED NETWORK

TECHNICAL FIELD

Embodiments presented in this disclosure generally relate to software licensing and, more particularly, to techniques for delegating authority over licenses, or other entitlements, to use software and hardware in a disconnected network.

BACKGROUND

Licenses for computer software and hardware are typically provided to end-user customers via a product activation key (PAK). A PAK is a code that a customer uses to enable, activate, or access features on computer products. The customer associates a PAK with a specific software product (or hardware device) by entering the PAK into a portal, which returns a cryptographic license key. When associated with a specific device, the license key unlocks features on the specific device or allows a software installation process to be completed. Accordingly, through a three-step process (from PAK, to license key, and to device configuration), the customer proves product ownership directly for every single software application installed on a hardware device as well as for each hardware device itself. Alternatively, a user may activate a network router by entering a license key into an interface on the network router. In response, the router passes information to the vendor, which validates the PAK and provides any license or use keys. In turn, the license key (or other information) is node-locked on the network router. Similarly, software may be activated by entering a PAK in an interface presented by an install tool. This licensing approach delegates decisions to enforce the software license into the hardware device (e.g., switch, router, etc.) or software application.

Such an approach is problematic where a vendor uses a channel partner (e.g., reseller) to distribute products to an end customer. The channel partner receives each PAK from the vendor and passes the PAK to a customer. When the PAK is sent to the vendor, the vendor typically does not know the identity of the customer. While the customer may include an identity when registering a hardware/software product, the customer may do so independently for each software product or hardware device.

The disconnect that results from independently registering/activating each hardware device or software installation results in a lack of an inventory of what licenses are owned (or used), for both the vendor and the customer. That is, the vendor and the end customer are often unaware of exactly what licenses a given customer has acquired. Further, this approach limits the ability of a customer to change how license rights are used, as license keys are typically node locked to a single device installation or hardware device. For example, assume a customer (e.g., a university) purchases from a reseller (e.g., a network equipment reseller) licenses for software. Assume, for example, that the software configures a local area network (LAN) to provide firewall services and that the customer acquires licenses for twelve routers. The customer receives license PAKs for the software for use on the twelve routers. Sometime later, the customer decides to purchase database services from the reseller, while downgrading the firewall services and implementing the software on only ten routers, instead of twelve routers. The licensing scheme does not provide a mechanism for the customer for such a change in license use or allocation across their devices.

To address compliance issues, the vendor may administer an auditing process after the fact to determine whether the customer is in compliance with their acquired license rights. However, doing so is complex, is expensive, and can cause poor customer relations Further, some customers require security that involves complete dissociation from the external networks. For such customers, communication between the customer and the vendor may be impossible. Examples of such customers include banks, investment firms, military and government networks, among others. Unfortunately, the security barriers these entities require present an additional difficulty for administering licensing schemes.

BRIEF DESCRIPTION OF THE FIGURES

So that the manner in which the above-recited features of the present disclosure can be understood in detail, a more particular description of the disclosure, briefly summarized above, may be had by reference to embodiments, some of which are illustrated in the appended figures. It is to be noted, however, that the appended figures illustrate only typical embodiments of this disclosure and are therefore not to be considered limiting of its scope, for the disclosure may admit to other equally effective embodiments.

FIG. 1 is a conceptual diagram of an example setup, which prepares a license manager device to delegate management authority to a collector device, according to one embodiment.

FIG. 2 is a conceptual diagram of an example authority delegation system, according to one embodiment.

FIG. 3 is a diagram of an example customer purchase, according to one embodiment.

FIG. 4 is a diagram of an example vendor computing system, which is configured to audit and manage licenses for using computer products, according to one embodiment.

FIG. 5 is a conceptual diagram of example license data that may be stored in the storage, according to one embodiment.

FIG. 6 is a diagram of an example collector system, which is configured to perform delegated authority operations, according to one embodiment.

FIG. 7 illustrates a method for registering computer products, according to one embodiment.

FIG. 8 illustrates a method for the license manager device to delegate authority to the collector device, according to one embodiment.

DESCRIPTION

Overview

Embodiments presented herein include a method, computer program product and system that provide cloud-based auditing and management of licenses to use computer products. Such a method may include receiving, at a collector device, a delegation of authority to provide authorization decisions to a plurality of computer products installed in a network infrastructure and licensed via a first pool of entitlements. This method may also include receiving an identifier of each computer product, receiving a set of licensed features enabled on each computer product, and sending an identification of licensed features to a license manager device that includes each identifier and each configuration state. In a particular embodiment, the method may further include receiving an authorization decision that indicates a compliance state for the plurality of computer products relative to the first pool of entitlements and sending the authorization decision to each computer product.

DESCRIPTION OF EXAMPLE EMBODIMENTS

Embodiments presented herein provide techniques for delegating authority over licenses to use software and hardware in a disconnected network. A customer purchases one or more computer products from a vendor. A license manager device of the vendor generates a customer account associated with the purchases. The customer account includes one or more pools of licenses. A pool of licenses includes a set of entitlements that the customer has for using the computer products. On behalf of each computer product, a collector device, which is located in a data center of a customer, registers each computer product with the license manager device of the vendor. A device is hardware, software, or a combination of software and hardware.

The collector device can then obtain a certificate or other cryptographic message from the license manager device. The certificate indicates a collector device is an authority, for the license manager device, to confirm an identity of computer products associated with the vendor and to collect licensed features of the computer products. Further, the delegation of authority allows new devices to register themselves with the collector device. Accordingly, the collector device receives identifiers of computer products associated with the vendor. The collector device also receives licensed features of the computer products associated with the vendor. The licensed features include sets of features enabled on the computer products. The collector device sends an identification of licensed features (e.g., a report of licensed features) to the license manager device that includes the identifiers and the licensed features.

Advantageously, by delegating authority to manage some licensing operations, the customer may maintain security on a network that disconnected from external networks. The license manager device can still send information stored in the database to a vendor management console and/or customer management console. The vendor and/or the customer can view the information on demand on the respective consoles. The license manager device thereby provides an accurate profile of registered computer products, entitlements, licensed features, and authorization decisions associated with the customer account.

Figure 1:
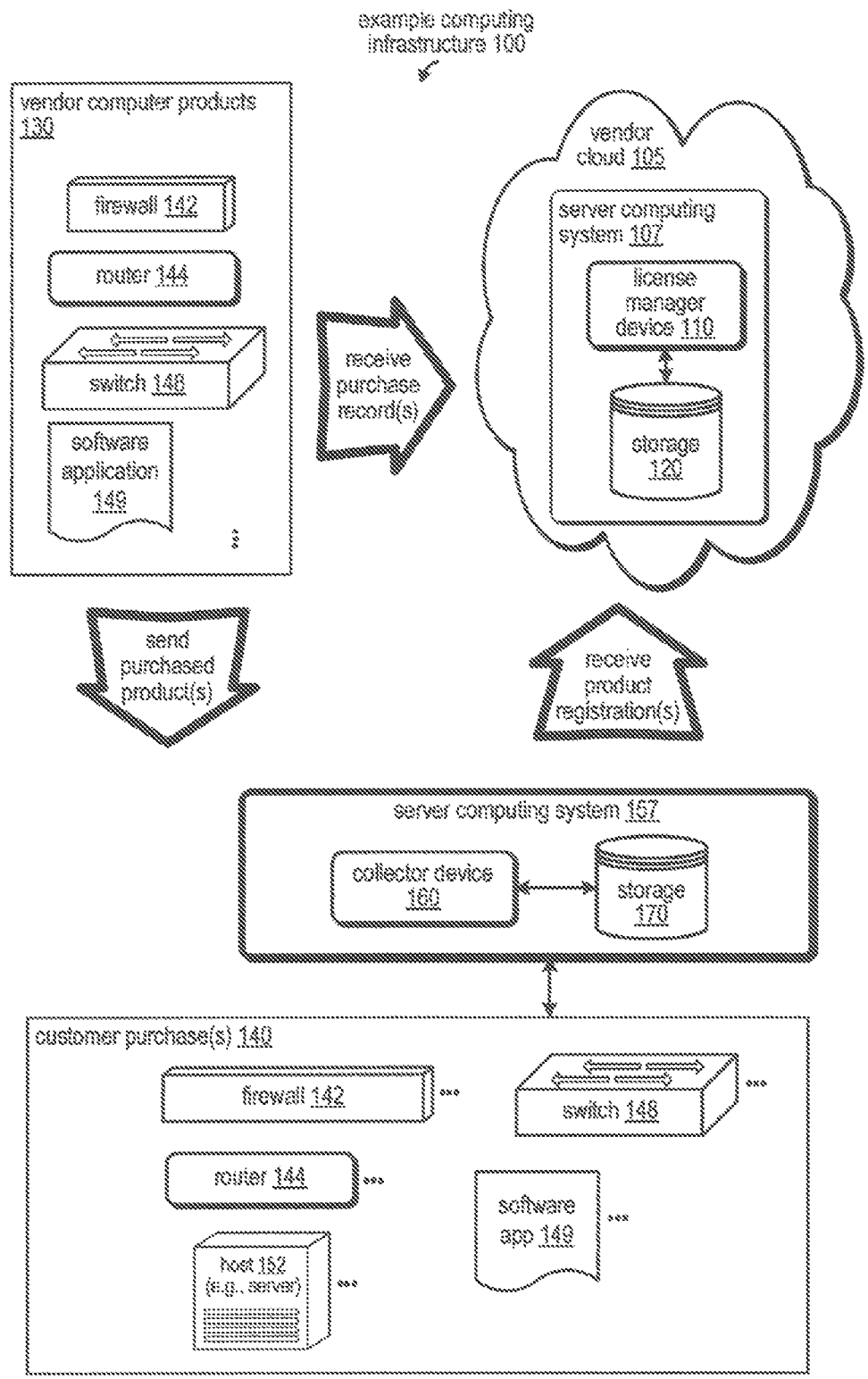

FIG. 1 is a conceptual diagram of an example computing infrastructure 100, which prepares a license manager device 110 to delegate management authority to a collector device 160, according to one embodiment. Before the license manager device 110 delegates management authority, the license manager device 110 generates a customer account associated with purchased computer products and registers the purchased computer products in the customer account.

As shown in FIG. 1, a vendor has computer products 130 available for purchase. For example, the vendor may be selling networking products, including a firewall 142, a router 144, a switch 148, and a software application 149. In this example, assume the customer purchases 140 include a firewall 142, a router 144, a switch 148, a software application 149, and a host 152 (e.g., server). The vendor sends the purchased products to the customer. Alternatively, the customer receives the purchased products from a partner (e.g., reseller or distributor, etc.) of the vendor and not directly from the vendor.

A server computing system 107 receives purchase records that describe the transactions involving the purchased computer products. For example, the purchase records may indicate what entitlements a given customer has acquired (and should be added to an entitlement pool associated with that customer in the vendor cloud 105). As shown, the server computing system 107 resides on a vendor cloud 105 and includes a license manager device 110 connected to a database 120. In some embodiments, the vendor cloud 105 can deliver license management services (via servers, storage, and applications) to both vendor computers and customer computers.

Upon receiving the purchase records, the license manager device 110 stores a customer account with the purchased products (and entitlements) in the database 120. The customer account may include an initial pool of entitlements. A pool of entitlements includes a set of licenses or other rights acquired by a customer to use a given computer product or family of products. A customer may create different pools of entitlements to manage different types of computer products as well as to manage the allocation of entitlements across an enterprise. Further, the customer may move entitlements from one pool to another. For example, assume that a customer creates an individual entitlement pool for different departments within an organization. If devices drawing entitlement from a first pool fall out of compliance, the customer could move entitlements from another pool to bring the first pool back into a compliant state. More generally, the customer may control what entitlements are associated with that pool.

To activate a computer product, the customer registers the computer product with the license manager device 110. The registration may include an identifier of the computer product, the customer, and any licensed features associated with that product. Once registered, the license manager device 110 may audit the use of computer products purchased by the customer.

Further, in one embodiment the license manager may delegate authority to a device inside a customer's private network. The delegation of authority may authorize the system inside the customer's private network to (1) register new computer products and/or entitlements to associate with the customer's entitlement pools and (2) to assert a state of "compliance" or "non-compliance" to the computer products in the customer's private network. Because the private network may be disconnected from any external network, the system inside the private network receiving the delegated authority, referred to herein as a collector device, is generally configured to act as a proxy for the license manager device of the vendor. To do so, the collector device stores authorization requests from the client devices, which may be periodically transmitted to the license manger device of the vendor. For example, the collector device may periodically be connected to an external network. Alternatively, for the most-secure networks, the information stored by the collector device may be copied to some form of portable storage, transferred to another system, and then submitted to the license manager device. In another case, information representing the configuration state of the devices in the private network may be written down and manually entered into a system communicating with the license manager device. In response, information representing a delegation of authority for the collector device and a compliance state for the devices in the secure network may be passed back to the collector device in a similar manner.

Figure 2:
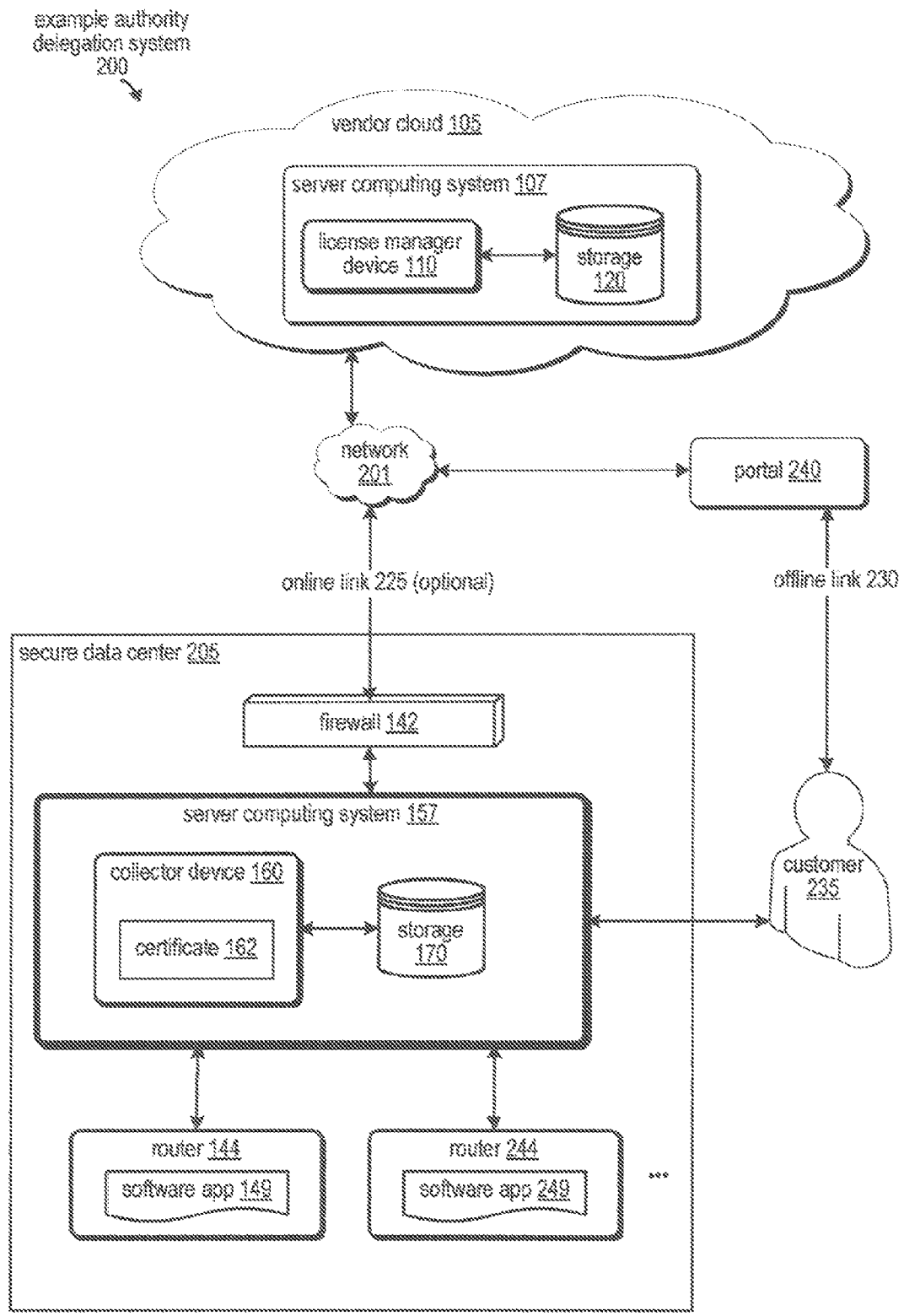

FIG. 2 is a conceptual diagram of an example authority delegation system 200, according to one embodiment. In one embodiment, the license manager device 110 in the vendor cloud 105 delegates authority to a collector device 160 in a secure data center 205.

A network 201 (e.g., the Internet) connects the vendor cloud 105 and the secure data center 205. In this example, secure data center 205 provides a network infrastructure behind a security barrier that is substantially (or completely) dissociated from the network 201.

An offline link 230 provides a primary connection between the secure data center 205 and the network 201. A portal 240 is configured to receive input from a customer 235 and to communicate with the server computing system 107 via the network 201. Note in this example, offline link 230 is not an electronic link, but rather represents the physical interface between the portal 240 and the customer 235. Alternatively or additionally, an online link 225 may connect the secure data center 205 to the network 201.

As shown in FIG. 2, the secure data center 205 includes one or more computer products purchased by a customer and connected to the network infrastructure. The collector device 160 communicates with each purchased computer product in the secure data center 205. In this example, the collector device 160 is connected to the firewall 142, the router 144, and a router 244. In this example, the software application 149 resides on the router 144, while the software application 249 resides on the router 244.

In one embodiment, the collector device 160 receives certificate 162 for a pool of licenses from the license manager device 110. With the certificate 162, the collector device 160 acts as a trusted third party entity for the license manager device 110. The license manager device 110 typically provides the collector device 160 with information to confirm identities of the purchased computer products (e.g., router 144, software application 244, etc.) and to collect licensed features from the computer products. Similarly, the collector device may register new computer products added to the infrastructure of the secure data center 205. The certificate 162 includes, for example, certificate signed by a vendor Certificate Authority that identifies the collector device 160 as a Root Certificate Authority.

In some implementations, the certificate 162 is part of a public key infrastructure scheme. Digital certificates in the authority delegation system 200 are verified using a chain of trust. The collector device 160 acts as the trusted root for each computer product (e.g., router 144, software application 244, etc.) that verifies the certificate 162. That is, the collector device 160 uses the certificate from the vendor to prove that the vendor has, in fact, delegated authority to the collector device to (1) collect license data from the hardware and software in the network infrastructure that is subject to the entitlements and (2) that any decision of compliance (or non-compliance) regarding the entitlements came from the vendor.

Verifying the certificate 162 includes a process of determining the certificate 162 is valid, signed, and trustworthy. The collector device 160 can check the validity period of the certificate 162 against the current time provided by a system clock for the collector device 144. Once the validity period ends, then the collector device 160 can no longer use the certificate 162 to prove that the collector device 160 has delegated authority from the vendor. Each computer product (e.g., router 144) can check and verify the validity period of the certificate 162. Each computer product may include keys used to validate the certificate 162 to the vendor root. An expired validity date, an invalid signature, or the absence of a certificate in the certificate chain causes authentication of the certificate 162 to fail. The computer products can disregard a message from the collector device 160 regarding entitlements if the certificate 162 cannot be properly validated.

In one embodiment, the collector device 160 receives an identifier and a report of the licensed features from each computer product deployed in the secure data center 205. In some embodiments, the licensed features report is received in a form of a request to use licensed features. In such cases, a computer product may begin to use (or continue using) the configured features before receiving an authorization decision from the collector device 160 indicating whether the computer products in the data center 205 are in compliance with the licenses and entitlements acquired by the customer.

As an example, assume a customer intends to use the router 144 and the router 244. The customer configures the routers 144, 244 for their intended use. For example, the customer may configure routers 144, 244 to each have five ports open and running a specific version of routing software/firmware. Routers 144, 244 may each include a cryptographic token (or other data) that identifies the respective router. Periodically, the routers send an identification of enabled licensed features along with each respective product identifier. An example infrastructure for a license enforcer is described below with reference to FIG. 3.

In order to maintain the validity of the certificate 162, the license manager device 110 requires the collector device 160 to communicate, in some manner, with the license manager device 110 within a validity period (e.g., every ninety days). To maintain security, the communication may involve the customer 235 manually generating an identification of licensed features for each computer product. Each report may include, for example, a product identifier and respective licensed features. The customer 235 can then input the identification of licensed features into the portal 240, which then sends the identification of licensed features to the license manager device 110.

Once the license manager device 110 receives the identification of licensed features, the license manager device 110 identifies an account associated with the product identifiers. The license manager device 110 compares the reported licensed features with a pool of license rights or entitlements associated with the customer account to generate a comparison result. For example, the pool of license entitlements may authorize the customer to use ten routers with five open ports per router. One report of licensed features may describe four open ports for a particular router. Meanwhile, the license manager device 110 may receive, for example, reports for nine other routers in the customer data center 205. The license manager device 110 stores the reports and all the comparison results in the storage 120.

The license manager device 110 aggregates the comparison results. Based on the aggregation, the license manager device 110 can generate an authorization decision for the license pool (e.g., for the ten routers). For example, if each of the ten routers is configured with four open ports and the entitlements authorize ten routers with five open ports each, then the license manager device 110 can generate an authorization decision of "in-compliance" for the ten routers. In contrast, if each of the ten routers is configured with six open ports and the entitlements authorize ten routers with five open ports each, then the license manager device 110 can generate an authorization decision that sends an "out-of-compliance" message to each of the ten routers (when the routers check in with the license manger device 110).

The license manager device 110 can send the authorization decision to the collector device 160 and/or to the portal 240 for the customer 235 to retrieve and then pass to the collector device 160. As discussed below, in one embodiment, the authorization decision may be stored in a message signed by a digital certificate indicating a validity period for the authorization decision.

In one embodiment, the authorization decision may take the form of a digital certificate signed by a vendor root—or other message signed by the vendor root. Such a message may include a validity period (e.g., ninety days) specifying that the collector device may assert that the computer products (otherwise disconnected from external networks) are "in compliance." That is, the collector device may assert to each computer product that there are sufficient entitlements in the customer's account to use the computer product as indicated by the reported licensed features. After a certain period, e.g., 30-45 days, the collector device 160 may send another status report to the vendor (or customers via the portal), allowing a new authorization decision (and corresponding certificate) to be received prior to the expiration of the current validity period. The authorization decision generally reflects the overall entitlement state of the customer account, or more specifically, whether there are sufficient entitlements in the customer account pools for the devices being reported upon by the collector device.

If the authorization decision indicates that the customer is not "in compliance," i.e., that there are insufficient entitlements in the customer account, then the collector device 160 can respond to a request for an authorization decision from the collector device with a message of "non-compliance." That is, the collector device is still delegated authority to assert compliance status to the underlying computer products. In turn, the computer products can then alter the functionality of the devices to encourage the customer to either change how the computer products are deployed or to acquire additional entitlements. Note, in some cases, this may include simply presenting or sending messages to an administrator indicating that the current use of a computer product is not in compliance. However, in other cases, features may be disabled on devices drawing entitlements from a pool with insufficient entitlements for all devices or applications drawing entitlements from that pool.

The license manager device 110 sends the authorization decision to the portal 240, where the customer 235 may recover the authorization decision and input the authorization decision into the server computing system 157. Alternatively, the license manager device 110 can send the authorization decision to the collector device 160 via the network 201, if the secure data center 205 (or just server 157) is connected online to the network 201. With the authorization decision, the license manager device 110 can also send an updated certificate to the collector device 160. In addition to indicating a state of compliance or non-compliance, the certificate and authorization decision may update the validity period (e.g., ninety more days) for the delegation of authority to the collector device 160.

The license enforcer on each computer product receives the authorization decision (e.g., "in-compliance" or "out-of-compliance") from the collector device. In some embodiments, the authorization decision includes instructions carried out by the license enforcer. For example, an authorization decision may include instructions to disable use of a computer product due to the license manager device determining the pool of licenses is out of compliance. The license enforcer on the computer products then enforces the authorization decision by carrying out the instructions of the authorization decision. Accordingly, the license manager device 110 can manage use of the purchased computer products by performing auditing operations and by generating and sending the authorization decision to the collector device 160 based on the audits.

Advantageously, the license manager device 110 can send information stored in the storage 120 to the customer portal 240 and/or a vendor management console (not shown). The vendor and/or the customer 235 can view the information on demand and obtain an accurate profile of registered computer products, entitlements, licensed features, and/or authorization decisions that are associated with the customer account. Also, via the collector device 160, the customer 235 can maintain a secure data center 205 by not connecting and/or securely connecting the secure data center 205 to the network 201.

Figure 3:
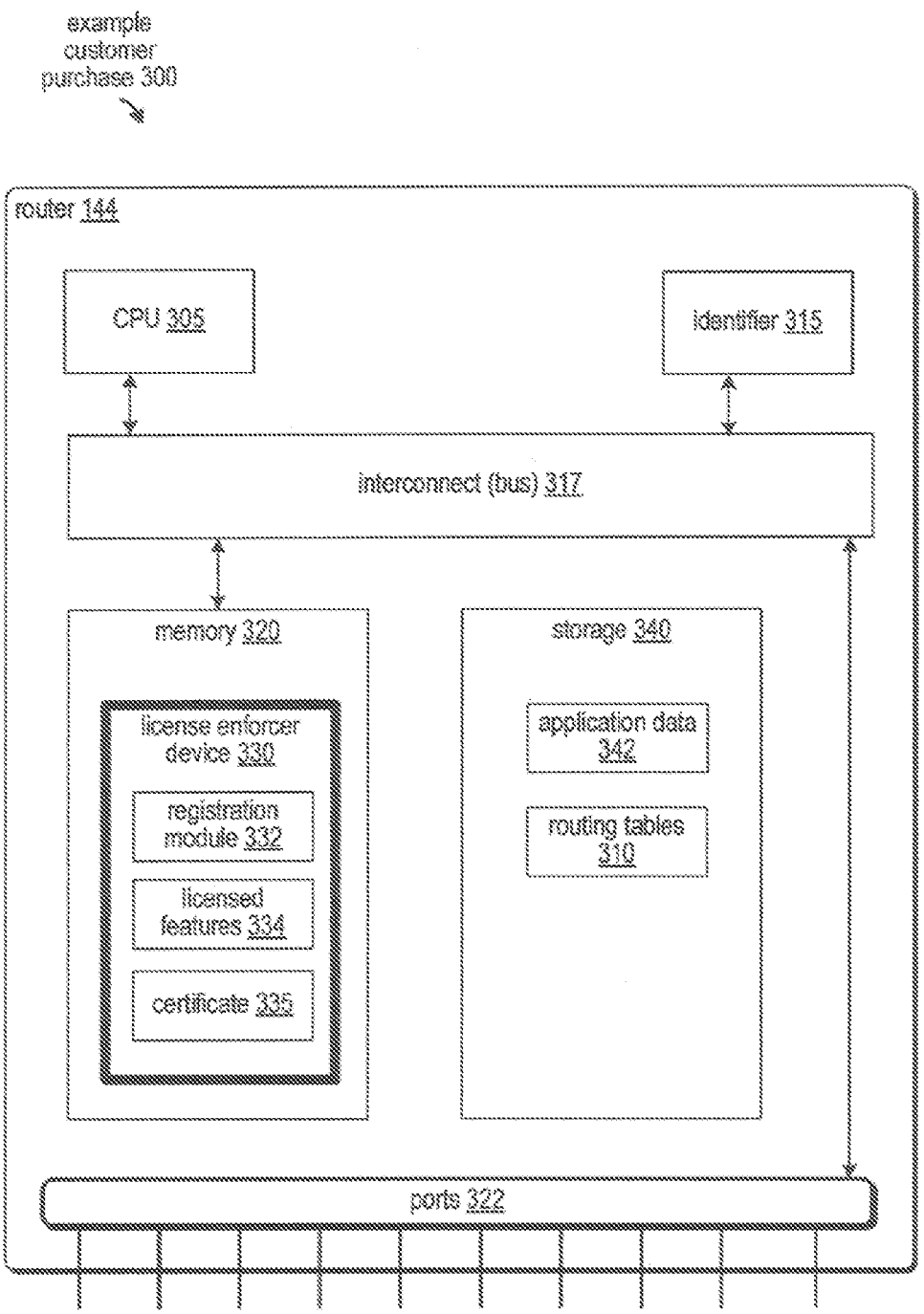

FIG. 3 is a diagram of an example customer purchase 300, according to one embodiment. For explanatory purposes, the customer purchase 300 includes a router 144. In context of this description, the computing elements shown in the router 144 correspond to hardware components and software modules (e.g., hardware and software in the secure data center 205 of FIG. 2).

As shown, the router 144 includes, a central processing unit (CPU) 305, an identifier 315, a memory 320, storage 340, and ports 322, each connected to a bus 317. The CPU 305 retrieves and executes programming instructions stored in the memory 320, as well as stores and retrieves application data 342 and routing tables 310 residing in the storage 340. Via the bus 317, the router 144 transmits programming instructions and application data 342 between the CPU 305, the identifier 315, the storage 340, the memory 320, and the ports 322. Note that the CPU 305 is included to be representative of a single CPU, multiple CPUs, a single CPU having multiple processing cores, and/or the like. The memory 320 is included to be generally representative of a random access memory. The storage 340 may be a disk drive storage device. Although shown as a single unit, the storage 340 may be a combination of fixed and/or removable storage devices, such as fixed disc drives, removable memory cards, or optical storage, network attached storage (NAS), or a storage area-network (SAN).

As shown, the license enforcer 330 in memory 320 includes, a registration module 332 a router licensed features 334, which are accessible over a network connected to a port 322. The registration module 332 is configured to register the router 144 as discussed with reference to FIGS. 1 and 7. The registration module 332 is configured to send the identifier 315, or a copy of the identifier 315, and the licensed features 334 to a collector device for the customer. The identifier 315 is shown as a hardware component (e.g., hardware chip containing cryptographic data) connected to the bus 317. Alternatively, the identifier 315 may include cryptographic data stored in the storage 340 or in memory 320.

Each certificate 335 received from the collector device indicates that the router 144 can operate "in compliance" (or "out of compliance") with the entitlements available from the pool of entitlements managed by the vendor. In some embodiments, the certificate 335 has a validity period (e.g., ninety days). Once the validity period expires, the license enforcer 330 notifies the customer that the authorization certificate used to validate an "in compliance" state has expired. The certificate 335 may also have a renewal period (e.g., thirty days) that is less than the validity period (e.g., ninety days). Once the renewal period expires, the license enforcer attempts to renew the certificate 335. That is, the trigger for the router 140 to communicate with the vendor to obtain a license authorization may be substantially less than the validity period for an "in compliance" state. Doing so may provide a customer with sufficient time to obtain a new authorization decision (i.e., a new certificate with a new validity period) as well as to identify and remedy the cause of a non-compliant situation.

Figure 4:
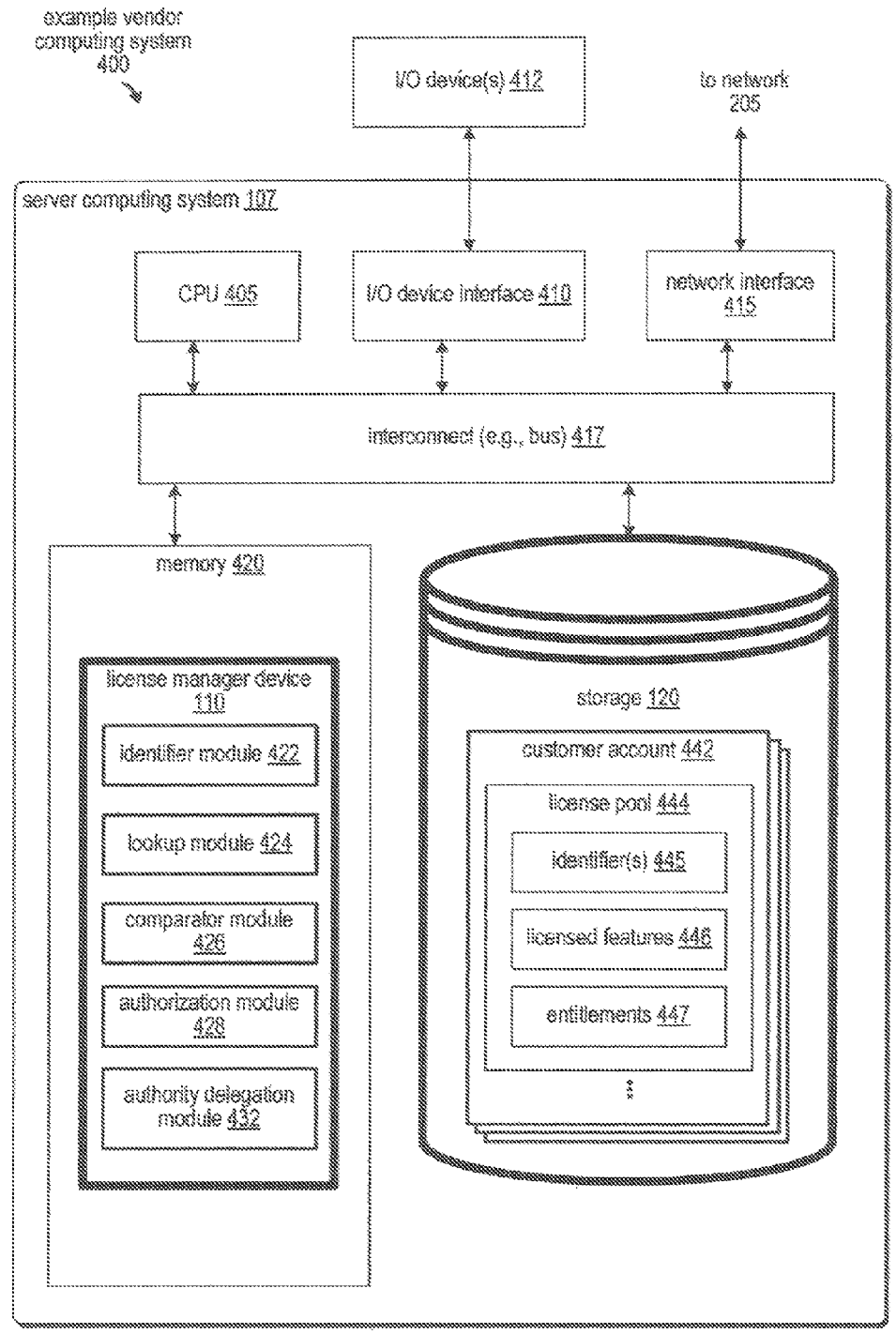

FIG. 4 illustrates an example vendor computing system 400 configured to audit and manage licenses for using computer products, according to one embodiment.

As shown in FIG. 4, the vendor computing system 400 includes, without limitation, a central processing unit (CPU) 405, an I/O device interface 410, a network interface 415, a memory 420, and storage 120, each connected to a bus 417. The I/O device interface 410 connects I/O devices 412 (e.g., keyboard, display, and mouse devices) to the vendor computing system 400. Further, in context of this description, the computing elements shown in vendor computing system 400 may correspond to a physical computing system (e.g., a system in a data center) or may be a virtual computing instance executing within the vendor cloud 105 of FIGS. 1 and 2.

The CPU 405 retrieves and executes programming instructions stored in the memory 420, as well as stores and retrieves application data residing in the storage 120. Via the bus 417, the server computing system 107 transmits programming instructions and application data between the CPU 405, the I/O devices interface 410, the storage 120, the network interface 415, and the memory 420. Note that CPU 405 is included to be representative of a single CPU, multiple CPUs, a single CPU having multiple processing cores, and/or the like. The memory 420 is included to be generally representative of a random access memory. The storage 430 may be a disk drive storage device. Although shown as a single unit, the storage 430 may be a combination of fixed and/or removable storage devices, such as fixed disc drives, removable memory cards, or optical storage, network attached storage (NAS), or a storage area-network (SAN).

The license manager device 110 resides in the memory 420. As shown, the license manager device 110 includes an identifier module 422, a lookup module 424, a comparator module 426, an authorization module 428, and an authority delegation module 432. The authority delegation module 432 is configured to send the certificate to another system (e.g., a portal), where the customer can transfer the digital certificate to the collector device. Alternatively, the authority delegation module 432 is configured to send a digital certificate to a collector device, which resides behind a secure barrier on customer premises. The identifier module 422 is configured to receive product identifiers and licensed features report from a portal (e.g., portal) to which a proxy has manually transferred the product identifier and the licensed features report. Alternatively, the identifier module 422 is configured to receive, from a collector device, the product identifiers and the licensed features. Based on the product identifiers, the lookup module 424 identifies a customer account 442. The comparator module 426 compares information in the identified customer account 442 with the licensed features received from the computer products. The comparator module 426 stores the licensed features and the comparison results in the customer account 442. The authorization module 428 aggregates the comparison results and generates an authorization decision for the computer products associated with the license pool 444 of the customer account 442.

Accordingly, the storage 120 includes, without limitation, one or more customer accounts, such as customer account 442. Each customer account includes license pools. For example, customer account 442 includes entitlements 447, which are associated with identifiers 445 of computer products and licensed features 446 of the computer products.

Figure 5:
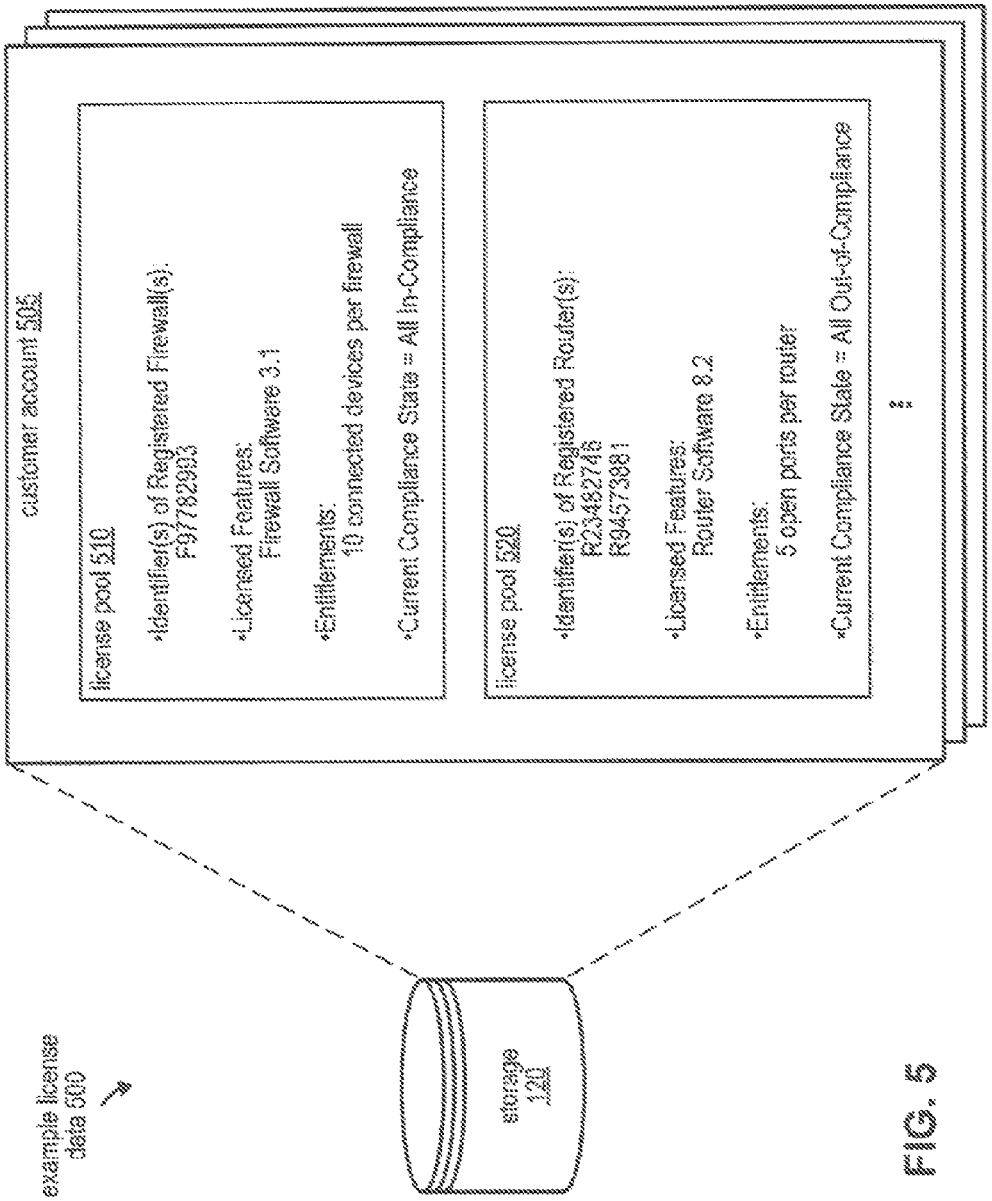

FIG. 5 is a conceptual diagram of example license data 500 in the storage 120, according to one embodiment. In this example, the license data 500 includes information regarding multiple customer accounts, including a customer account 505. The customer account 505 includes multiple license pools, including a license pool 510 and a license pool 520.

The license pool 510 includes an identifier of a registered firewall. The set of licensed features of the registered firewall indicates the registered firewall is configured to run Firewall Software 3.1. The entitlements indicate the registered firewall is authorized to have ten connected devices. The current compliance state indicates the registered firewall is in-compliance.

Figure 6:
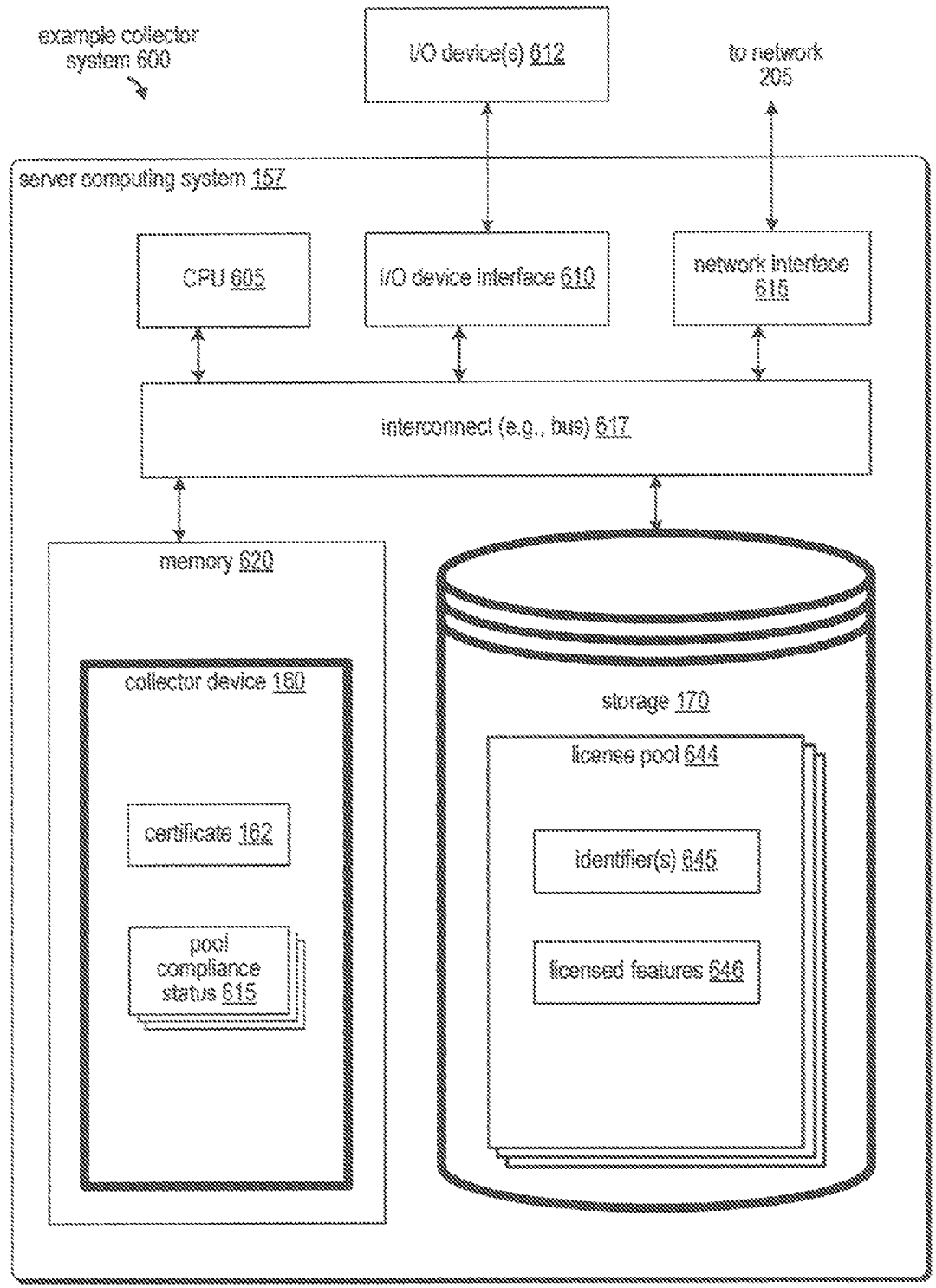

The license pool 520 includes identifiers of registered routers. The current set of licensed features of the registered routers indicates the routers are configured with Router Software 8.2. The entitlements indicate the registered routers are authorized to have five open ports per router. The current compliance state indicates the registered routers are out-of-compliance. FIG. 6 illustrates an example collector system 600 configured to perform delegated authority operations, according to one embodiment.

As shown in FIG. 6, the collector system 600 includes, without limitation, a central processing unit (CPU) 605, an I/O device interface 610, a network interface 615, a memory 620, and storage 120, each connected to a bus 617. The I/O device interface 610 connects I/O devices 612 (e.g., keyboard, display, and mouse devices) to the collector system 600. Further, in context of this description, the computing elements shown in collector system 600 may correspond to a physical computing system (e.g., a system in a data center) or may be a virtual computing instance executing within the secure data center 205 of FIGS. 1 and 2.

The CPU 605 retrieves and executes programming instructions stored in the memory 620, as well as stores and retrieves application data residing in the storage 120. Via the bus 617, the server computing system 157 transmits programming instructions and application data between the CPU 605, the I/O devices interface 610, the storage 170, the network interface 615, and the memory 620. Note that CPU 605 is included to be representative of a single CPU, multiple CPUs, a single CPU having multiple processing cores, and/or the like. The memory 620 is included to be generally representative of a random access memory. The storage 630 may be a disk drive storage device. Although shown as a single unit, the storage 630 may be a combination of fixed and/or removable storage devices, such as fixed disc drives, removable memory cards, or optical storage, network attached storage (NAS), or a storage area-network (SAN).

A collector device 160 resides on the memory 620 and includes, without limitation, a certificate 162 and a pool compliance status 615 for each product identifier over which the collector device 160 has authority. The certificate 162 is received from the license manager device 110 and configures the collector device to be a trusted third party entity for the license manager device 110. The certificate 162 is described above with reference to FIG. 6. Each pool compliance status 615 indicates whether a pool of products is in-compliance or out-of-compliance with entitlements maintained by the license manager device 160.

Accordingly, the storage 170 includes, without limitation, one or more license pools, such as license pool 644, which includes one or more identifiers 645 of computer products and licensed features 646 of the computer products in the license pool 644.

Figure 7:
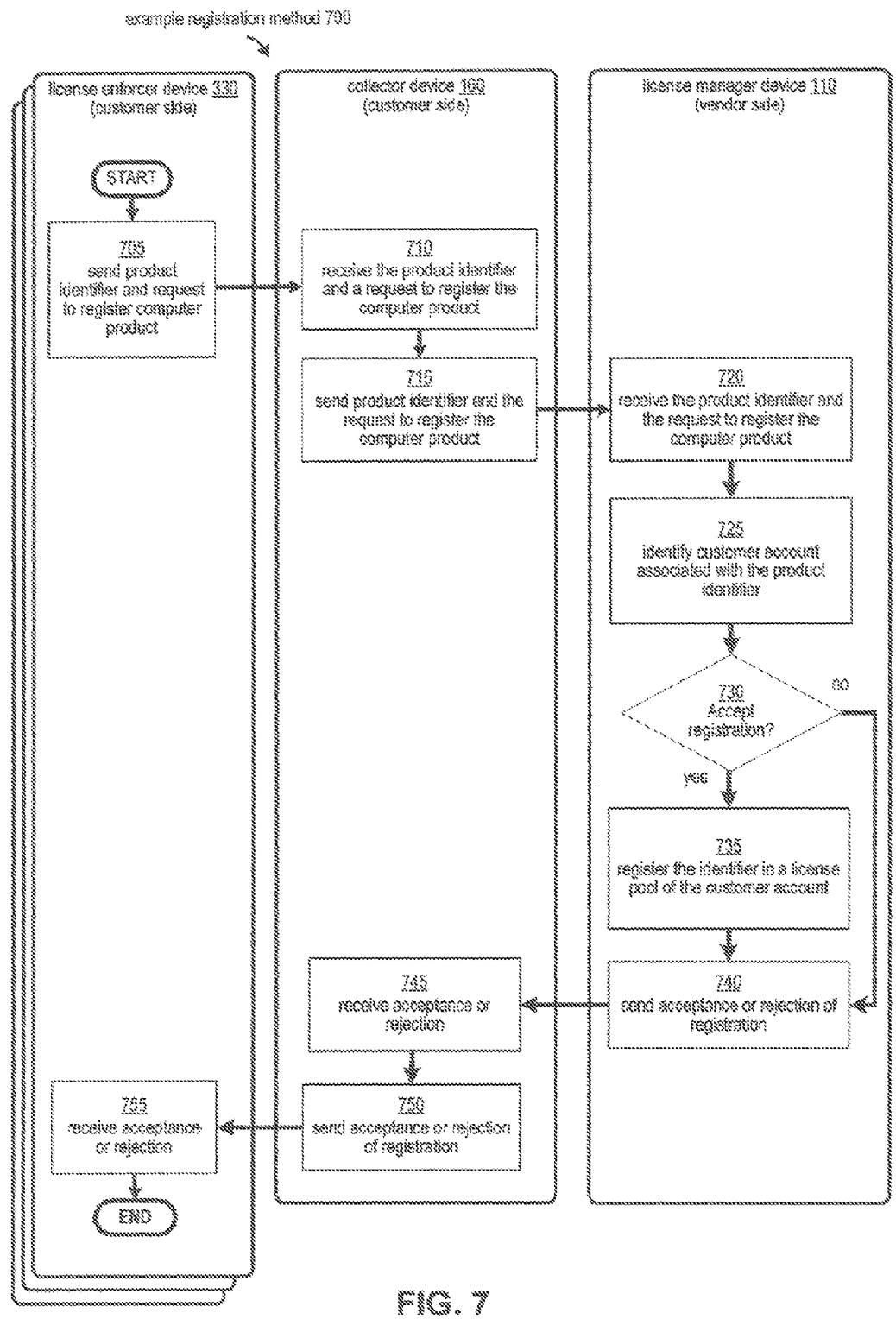

FIG. 7 illustrates a method 700 for registering computer products, according to one embodiment. The method 700 is part of setup operations discussed above with reference to FIG. 1. At step 705, the license enforcer 330 sends a product identifier and a request to register the computer product. At step 710, the collector device 160 on the customer side receives the product identifier and the request to register the computer product.

At step 715, the collector device 160 on the customer side sends the product identifier and the request to register the computer product to the license manager device 110. Additionally, as the collector device 160 is disconnected from the license manger device 160, the collector device 160 may send a pending registration message to the requesting computer product. That is, the collector device may presumptively send a registration message to the license enforcer 330 on the computer product requesting a new registration, without waiting for an actual message from the license manager device 110. In some embodiments, step 715 involves intermediate steps of the collector device 160 aggregating the registration information, the customer printing out the registration information and inputting the registration information into a portal that then sends the registration information to the license manager device 110. Alternatively, the customer can use a flash drive, or similar device, to transfer the registration information to the portal. Alternatively, the collector device 160 may be connected online and authorized to communicate online with the license manager device 110 to send the registration information. At step 720, the license manager device 110 receives the product identifier and the request to register the computer product.

At step 725, the license manager device 110 identifies a customer account associated with the product identifier. In some embodiments, the customer account is generated at the time of purchase, as described above with reference to FIG. 1. At 730, the license manager device 110 determines whether to accept or reject the registration. If the license manager device 110 accepts the registration, at step 735, the license manager device 110 registers the identifier in a license pool of the customer account. And at step 740, the license manager device 110 sends an acceptance to the collector device 160. In some embodiments, the license manager device 110 communicates with the collector device 160 via offline communication, and may do so in the aggregate for a group of underlying computer products. Alternatively, the license manager device 110 can register the identifier with the customer account but separately from the license pool. However, if the license manager device 110 rejects the registration, at step 740, the license manager device 110 sends a rejection to the collector device 160. Note because the license manager 110 and collector device 160 may be disconnected from one another, the accepted or rejected registration may be communicated to the collector device 160 via an offline channel. At step 745, the collector device 160 receives a notification of either the acceptance or the rejection, e.g., via an administrator copying information to a flash drive or manually keying in information to the collector device 160. At step 750, the collector device sends either the acceptance or the rejection to the license enforcer 330. As noted, the license enforcer 330 may have already received a pending registration status used to provide an interim "in compliance" registration while the actual registration with the license manager device 110 occurs via the offline communications discussed above. At step 755, the license enforcer 330 receives either the acceptance or the rejection.

Figure 8:
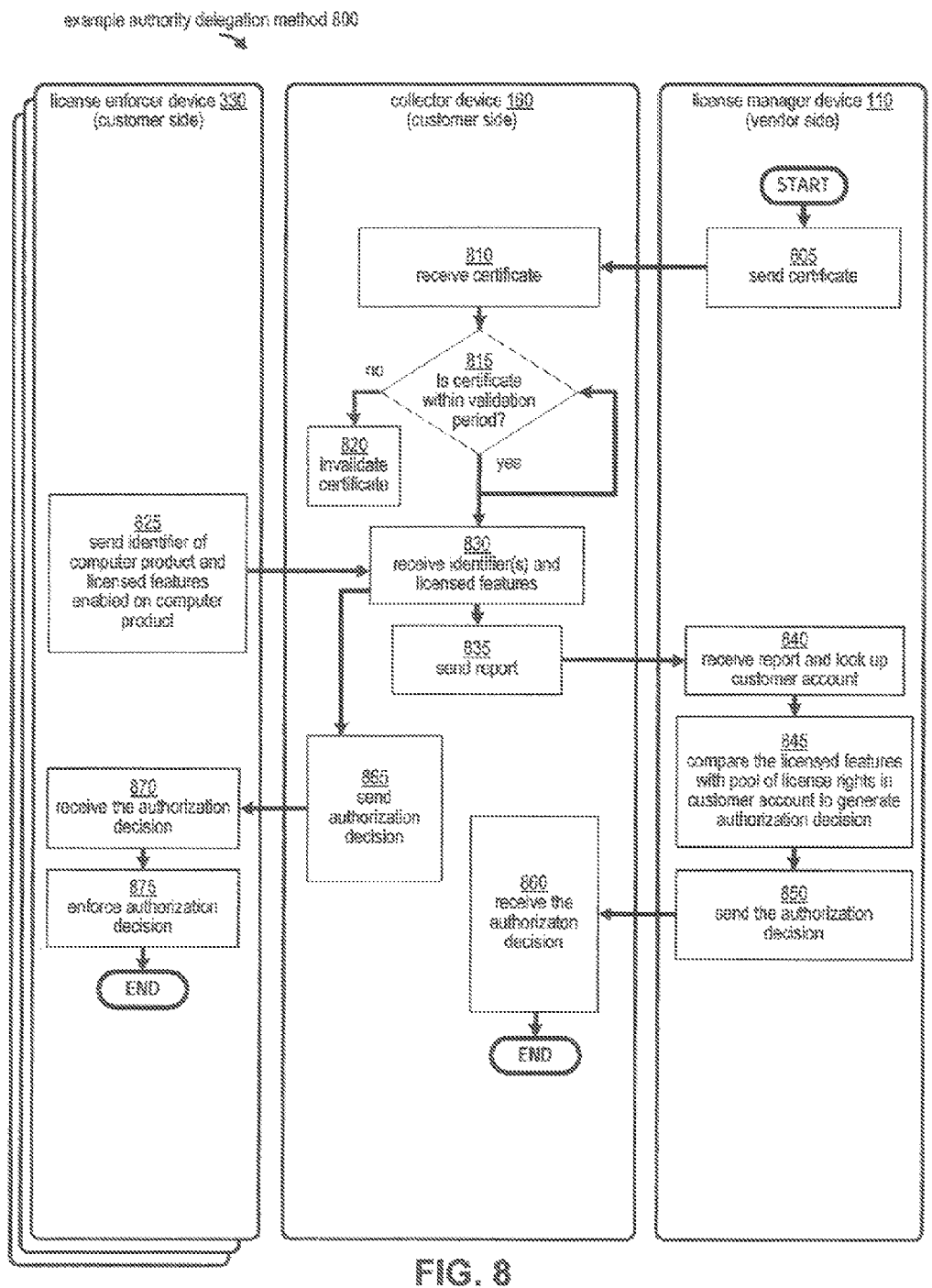

FIG. 8 illustrates a method 800 for the license manager device 110 to delegate authority to the collector device 160, according to one embodiment. Note, in this example assume the license enforcer components on the computing systems in a secure data center are disconnected from external networks and thus, from the license manager device 110. Once the collector device 160 receives delegated authority from the license manager device 110, the collector device 160 may provide authorization decisions to the applications and hardware systems in the secure data center. As shown, the collector device 160 engages in a compliance communication with the license manager device 110 of the vendor. The collector device 160 receives a compliance decision (e.g., "in compliance" or "out of compliance") based on an aggregation of reports of how licensed features are enabled or used on the underlying computer products in the secure data center.

In one embodiment, prior to being delegated authority, the customer registers a system within the secure data center to act as the collector device. For example, a customer may have an authenticated account with the vendor and use this account to request a delegated authority certificate for a given system in the secure data system. Note, the vendor may engage in any form of appropriate identify investigation and authentication before allowing a customer to create a collector device (i.e., before issuing a certificate delegating authority to a customer system).

Separate from the compliance communication, the collector device 160 can provide an authorization status to the connected computer products. Depending on the timing of when the collector device has received an authorization decision from the license manager device 110, the authorization status provided to the computer products may not reflect the current authorization decision of the license manager 110. Due to the disconnected communications, there may frequently be a significant difference in time between the authorization decision at the collector device 160 and the authorization decision at the license manager 110.

Also, the certificate received by the collector device 160 may have validity period (e.g., ninety days) much longer than a renewal period (e.g., thirty days), as discussed above with reference to FIGS. 2 and 3. The delegated authority lasts for a longer period than the shorted renewal period to accommodate the disconnected communications. That is, while the delegated authority may be valid for ninety days, the renewal attempts begin after thirty days to give an administrator adequate time to renew the authority delegation using a disconnected network.

As shown, the method 800 begins at step 805, where the license manager device 110 sends a digital certificate to the collector device 160. In some embodiments, step 805 may include sending the digital certificate to a portal, the customer reading the digital certificate from the portal and then entering or otherwise transferring or copying the digital certificate onto the collector device 160. Alternatively, the customer can transfer the digital certificate from the portal onto a flash drive, or similar device, and then connect the flash drive to the collector device 160. However, for high security systems, it may be desirable to have the least amount of electronic connection as possible. At step 810, the collector device 160 receives the certificate 810.

At step 815, the collector device 160 determines whether the certificate is within the validity period. If the validity period has expired, then at step 820 the collector device 160 determines the certificate is invalid. Each computer product may also check the validity of the certificate, in order to authentication an authorization decision from the collector device regarding entitlement usage. For example, anytime the collector device 160 needs to use the digital certificate to assert delegated authority, a computer product can check both (1) a validity of a key of the certificate against a root in the computer product and (2) the extensions or attributes of the certificate that indicate validity.

At step 825, the license enforcer 330 sends, to the collector device 160, a product identifier and a set of licensed features enabled for use (e.g., configuration state) on the computer product. At step 830, the collector device 160 receives the product identifiers and corresponding licensed features from the computer products.

Accordingly, at step 835, the collector device 160 communicates with the license manager device 110 by sending a report including the one or more product identifiers and the one or more respective licensed features to the license manager device 110. Step 835 may involve intermediate steps of the customer printing out the report and manually inputting the report into a portal that then sends the report to the license manager device 110. Alternatively, the customer can use a flash drive, or similar device, to transfer the report to the license manager device 110. At step 840, the license manager device 110 receives the report and looks up a customer account that is associated with the one or more product identifiers.

At step 845, the license manager device 110 compares the licensed features with the pool of license rights in the customer account to generate a compliance decision. Generating the compliance decision may involve the license manager device 110 aggregating one or more comparison results. For example, the license manager device 110 aggregates the comparison results in the license pool to generate an aggregated comparison result. The authorization decision (e.g., in compliance or out-of-compliance) is the same for all the computer products in the license pool. For example, the license manager device 110 may indicate all routers in the secure data center are in compliance. That is, the authorization decision may indicate that the entitlement pool managed by the vendor contains sufficient entitlements to cover the configured state of the systems in the secure data center, as reported via the collector device.

At step 850, the license manager device 110 sends the authorization decision to the collector device 160. At step 860, the collector device 160 on the customer side receives the authorization decision, which includes instructions to be carried out by the license enforcers of the computer products. In this example, this concludes communications between the collector device 160 and the license manager device 110.

At step 865, the collector device 160 continues from step 830 by sending an authorization decision 865 to each computer product in the secure data center reflecting the authorization decision. Further, as noted, the collector device 160 may prove authority using a certificate received from the license manager device. Depending on the timing, the authorization decision sent at step 865 may reflect the authorization decision received from the license manager device 110 at step 860. However, where there is a delay in the authorization reaching the collector device 160, there may be a discrepancy between the authorization decision at the license manager device 110 and the authorization decision at the collector 160. At step 870, each license enforcer, i.e., each computer product in the secure data center, receives the authorization decision. At step 875, each license enforcer causes the corresponding computer product to operate in accordance with the authorization decision. In the case of non-compliance, this may be as benign as the computer product notifying an administrator that the device is not operating in compliance with the available entitlements. However, in some cases, a state of non-compliance may result in features or capabilities of the device being degraded or disabled.

These methods may include other steps and/or details not discussed in this overview of example methods. Other steps and/or details described herein may be a part of the methods, depending on the implementation. A person skilled in the art will understand that any system configured to implement the method steps, in any order, falls within the scope of the present invention.

While the forgoing is directed to embodiments of the present disclosure, other and further embodiments of the disclosure may be devised without departing from the basic scope thereof. For example, aspects of the present disclosure may be implemented in hardware, software, or a combination of hardware and software. One embodiment of the disclosure may be implemented as a program product for use with a computer system. The program(s) of the program product define functions of the embodiments (including the methods described herein) and can be contained on a variety of computer-readable storage media. Illustrative non-transitory computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

What is claimed is:

1. A method comprising:
   receiving, at a collector device, a certificate representing a delegation of authority to provide authorization decisions to a plurality of computer products installed in a network infrastructure and licensed via a first pool of entitlements, wherein each of the plurality of computer products can validate the certificate to prove the delegation of authority;
   receiving an identifier of each computer product;
   receiving a set of licensed features enabled on each computer product;
   sending an identification of licensed features to a license manager device that includes each identifier and each configuration state; and
   upon determining that a validity period has not expired by checking the certificate, confirming the delegated authority to provide the authorization decisions.

2. The method of claim 1, further comprising:
   receiving an authorization decision that indicates a compliance state for the plurality of computer products relative to the first pool of entitlements; and
   sending the authorization decision to each computer product.

3. The method of claim 2, wherein sending the identification of licensed features comprises sending the identification of licensed features via an offline communication link, and wherein receiving the authorization decision comprises receiving the authorization via the offline communication link.

4. The method of claim 1, further comprising:
   determining that the validity period has an expired state based on checking the validity period of the certificate, invalidating the delegated authority to provide the authorization decisions.

5. The method of claim 1, further comprising:
   upon determining that a renewal period has an expired state, initiating a request to renew the certificate.

6. A computer product, comprising:
   a computer code that receives a certificate representing a delegation of authority to provide authorization decisions to a plurality of computer products installed in a network infrastructure and licensed via a first pool of entitlements, wherein each of the plurality of computer products can validate the certificate to prove the delegation of authority;

a computer code that receives an identifier of each computer product;
a computer code that receives a set of licensed features enabled on each computer product;
a computer code that sends an identification of licensed features to a license manager device that includes each identifier and each configuration state;
a computer code that, upon determining that a validity period has not expired by checking the certificate, confirms the delegated authority to provide the authorization decisions; and
a non-transitory computer-readable medium that stores the computer codes.

7. The computer product of claim 6, the steps further comprising:
a computer code that receiving an authorization decision that indicates a compliance state for the plurality of computer products relative to the first pool of entitlements; and
a computer code that sends the authorization decision to each computer product.

8. The computer product of claim 7, wherein the computer code that sends the identification of licensed features comprises a computer code that sends the identification of licensed features via an offline communication link, and wherein the computer code that receives the authorization decision comprises a computer code that receives the authorization via the offline communication link.

9. The computer product of claim 6, further comprising:
a computer code that determines that the validity period has an expired state based on checking the validity period of the certificate, invalidating the delegated authority to provide the authorization decisions.

10. The computer product of claim 6, the further comprising:
a computer code that, upon determining that a renewal period has an expired state, initiates a request to renew the certificate.

11. A system, comprising:
a processor; and
a memory hosting an application, which, when executed on the processor, performs an operation for delegating authority to manage licenses to use computer products, the operation comprising:
receiving a certificate representing a delegation of authority to provide authorization decisions to a plurality of computer products installed in a network infrastructure and licensed via a first pool of entitlements, wherein each of the plurality of computer products can validate the certificate to prove the delegation of authority;
receiving an identifier of each computer product;
receiving a set of licensed features enabled on each computer product;
sending an identification of licensed features to a license manager device that includes each identifier and each configuration state; and
upon determining that a validity period has not expired by checking the certificate, confirming the delegated authority to provide the authorization decisions.

12. The system of claim 11, the operation further comprising:
receiving an authorization decision that indicates a compliance state for the plurality of computer products relative to the first pool of entitlements; and
sending the authorization decision to each computer product.

13. The system of claim 12, wherein sending the identification of licensed features comprises sending the identification of licensed features via an offline communication link, and wherein receiving the authorization decision comprises receiving the authorization via the offline communication link.

14. The system of claim 11, the operation further comprising:
determining that the validity period has an expired state based on checking the validity period of the certificate, invalidating the delegated authority to provide the authorization decisions.

15. The system of claim 11, the operation further comprising:
upon determining that a renewal period has an expired state, initiating a request to renew the certificate.

16. A system, comprising:
a processor; and
a memory hosting an application, which, when executed on the processor, performs an operation for delegating authority to manage licenses to use computer products, the operation comprising:
receiving a delegation of authority to provide authorization decisions to a plurality of computer products installed in a network infrastructure and licensed via a first pool of entitlements;
receiving an identifier of each computer product;
receiving a set of licensed features enabled on each computer product;
sending an identification of licensed features to a license manager device that includes each identifier and each configuration state;
receiving, via an offline communication link, an authorization decision that indicates a compliance state for the plurality of computer products relative to the first pool of entitlements; and
sending, via the offline communication link, the authorization decision to each computer product.

17. The system of claim 16, wherein receiving the delegation of authority further comprises receiving a certificate, and wherein each of the plurality of computer products can validate the certificate to prove the delegation of authority.

18. The system of claim 16, the operation further comprising:
upon determining that the validity period has not expired by checking a validity period of the certificate, confirming the delegated authority to provide the authorization decisions.

19. The system of claim 16, the operation further comprising:
upon determining that the validity period has an expired state based on checking the validity period of the certificate, invalidating the delegated authority to provide the authorization decisions.

20. The system of claim 16, the operation further comprising:
upon determining that a renewal period has an expired state, initiates a request to renew the certificate.

* * * * *